United States Patent
Mays et al.

(10) Patent No.: US 10,798,070 B2
(45) Date of Patent: *Oct. 6, 2020

(54) AUTHENTICATING CREDENTIALS FOR MOBILE PLATFORMS

(71) Applicant: COMCAST CABLE COMMUNICATIONS, LLC, Philadelphia, PA (US)

(72) Inventors: David Mays, Palmyra, NJ (US); Jason Press, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,113

(22) Filed: Jun. 11, 2019

(65) Prior Publication Data
US 2019/0372942 A1   Dec. 5, 2019

Related U.S. Application Data

(63) Continuation of application No. 15/812,904, filed on Nov. 14, 2017, now Pat. No. 10,362,004, which is a
(Continued)

(51) Int. Cl.
*H04L 29/06* (2006.01)
*G06Q 30/02* (2012.01)
(Continued)

(52) U.S. Cl.
CPC ...... *H04L 63/0428* (2013.01); *G06F 21/6254* (2013.01); *G06Q 30/02* (2013.01);
(Continued)

(58) Field of Classification Search
None
See application file for complete search history.

(56) References Cited

U.S. PATENT DOCUMENTS 7,996,912 B2   8/2011   Spalink et al.
8,015,117 B1   9/2011   Lillibridge et al.
(Continued)

FOREIGN PATENT DOCUMENTS

| CA | 2829323 | 10/2013 |
|---|---|---|
| CA | 2829323 A1 | 4/2014 |

(Continued)

OTHER PUBLICATIONS

European Search Report was dated Aug. 31, 2016 by the European Patent Office for EP Application 13187643.5, which was filed on Oct. 8, 2013 and published as EP 2717544 A2 on Apr. 9, 2014 (Applicant—Comcast Cable Communications, LLC.) (7 pages).

(Continued)

*Primary Examiner* — Kaveh Abrishamkar
(74) *Attorney, Agent, or Firm* — Ballard Spahr LLP

(57) ABSTRACT

Systems and methods for providing services are disclosed. One aspect comprises authenticating a user associated with a first service, receiving a selection of a second service, generating an opaque identifier associated with the user and the first service, wherein the opaque identifier facilitates the anonymous collection of data relating to the second service. Another aspect can comprise transmitting the opaque identifier to the second service, and receiving data relating to the second service.

52 Claims, 6 Drawing Sheets

Related U.S. Application Data continuation of application No. 14/552,991, filed on Nov. 25, 2014, now Pat. No. 9,853,951, which is a continuation of application No. 13/647,159, filed on Oct. 8, 2012, now Pat. No. 8,925,054.

(51) Int. Cl.
<table>
<tr><td>H04N 21/24</td><td>(2011.01)</td></tr>
<tr><td>H04N 21/258</td><td>(2011.01)</td></tr>
<tr><td>H04N 21/41</td><td>(2011.01)</td></tr>
<tr><td>H04N 21/442</td><td>(2011.01)</td></tr>
<tr><td>H04N 21/835</td><td>(2011.01)</td></tr>
<tr><td>G06F 21/62</td><td>(2013.01)</td></tr>
</table>

(52) U.S. Cl.
CPC ...... H04L 63/0421 (2013.01); H04L 63/0807 (2013.01); H04L 63/10 (2013.01); H04N 21/2407 (2013.01); H04N 21/258 (2013.01); H04N 21/25875 (2013.01); H04N 21/25883 (2013.01); H04N 21/25891 (2013.01); H04N 21/4126 (2013.01); H04N 21/44222 (2013.01); H04N 21/835 (2013.01); H04L 2209/42 (2013.01)

(56) References Cited

U.S. PATENT DOCUMENTS

| | | | | |
|---|---|---|---|---|
| 8,925,054 B2* | 12/2014 | Mays | ............... | H04L 63/0421 726/6 |
| 9,853,951 B2* | 12/2017 | Mays | ............... | H04L 63/0421 |
| 10,362,004 B2* | 7/2019 | Mays | ............... | H04N 21/44222 |
| 2002/0019764 A1 | 2/2002 | Mascarenhas | | |
| 2003/0188171 A1 | 10/2003 | Decenzo et al. | | |
| 2006/0070117 A1 | 3/2006 | Spalink et al. | | |
| 2007/0022459 A1* | 1/2007 | Gaebel, Jr. | ............. | H04N 7/165 725/114 |
| 2007/0130343 A1 | 6/2007 | Pardo-Blazquez et al. | | |
| 2008/0086380 A1* | 4/2008 | Cohen | .................. | G06Q 30/02 705/14.64 |
| 2008/0293378 A1 | 11/2008 | Hinton et al. | | |
| 2008/0293411 A1 | 11/2008 | Hinton et al. | | |
| 2009/0182873 A1 | 7/2009 | Spalink et al. | | |
| 2009/0247193 A1 | 10/2009 | Kalavade | | |
| 2009/0282468 A1 | 11/2009 | Banga et al. | | |
| 2010/0088715 A1 | 4/2010 | Sloo | | |
| 2010/0198870 A1 | 8/2010 | Petersen et al. | | |
| 2010/0313009 A1 | 12/2010 | Combet et al. | | |
| 2011/0225417 A1* | 9/2011 | Maharajh | ............... | G06F 21/10 713/150 |
| 2012/0046017 A1 | 2/2012 | Jennings | | |
| 2012/0167189 A1 | 6/2012 | Aichroth et al. | | |
| 2013/0054366 A1 | 2/2013 | Roundtree et al. | | |
| 2013/0110978 A1 | 5/2013 | Gordon et al. | | |
| 2013/0124628 A1 | 5/2013 | Weerasinghe | | |
| 2014/0074859 A1* | 3/2014 | Swaminathan | ........ | G06Q 30/02 707/748 |
| 2014/0101736 A1 | 4/2014 | Mays et al. | | |
| 2014/0373046 A1 | 12/2014 | Franji | | |
| 2015/0082037 A1 | 3/2015 | Mays et al. | | |
| 2018/0139187 A1 | 5/2018 | Mays et al. | | |

FOREIGN PATENT DOCUMENTS

| | | |
|---|---|---|
| EP | 13187643.5 | 10/2013 |
| EP | 2717544 A2 | 4/2014 |
| WO | WO-2008/141947 A2 | 11/2008 |

OTHER PUBLICATIONS

U.S. Appl. No. 13/647,159 (U.S. Pat. No. 9,925,054), filed Oct. 8, 2012 Dec. 30, 2013, David Mays.
U.S. Appl. No. 14/552,991 (U.S. Pat. No. 9,853,951), filed Nov. 25, 2014 Dec. 26, 2017, David Mays.
U.S. Appl. No. 15/812,904 (U.S. Pat. No. 10,362,004), filed Nov. 14, 2017 Jul. 23, 2019, David Mays.

* cited by examiner

AUTHENTICATING CREDENTIALS FOR MOBILE PLATFORMS

CROSS REFERENCE TO RELATED APPLICATIONS

This application is a continuation of U.S. Non-Provisional patent application Ser. No. 15/812,904 filed Nov. 14, 2017, which is a continuation of U.S. Non-Provisional patent application Ser. No. 14/552,991 filed Nov. 25, 2014, now issued as U.S. Pat. No. 9,853,951, which is a continuation of U.S. Non-Provisional application Ser. No. 13/647,159 filed Oct. 8, 2012, now issued as U.S. Pat. No. 8,925,054, which are herein incorporated by reference in their entireties.

BACKGROUND

Users exhibit certain preferences and behaviors in response to content such as user selections made from available content. The rapid expansion of user devices and associated functionality, such as electronic mail communication, network browsing, music and video downloading and playback, and the like, will continue into the future. With many functions, the user device or software executing on the device may be configured to collect data relating to the users' behaviors, interaction, preferences, and/or profiles associated with each activity. Content owners and providers may employ resources, e.g., third parties, to assist in the collection of such user-related data. However, current systems and methods are not sufficient to, among other things, collect data relating to user activities.

SUMMARY

It is to be understood that both the following general description and the following detailed description are exemplary and explanatory only and are not restrictive. Methods and systems for providing services are disclosed. The methods and systems described herein, in one aspect, can facilitate anonymous collection of data relating to one or more services provided to a user. As an example, services can be provided via a user device such as a portable communication device.

In an aspect, some methods can comprise authenticating a user associated with a first service and receiving a selection related to a second service. An opaque identifier associated with the user and the first service can be generated, wherein the opaque identifier facilitates the anonymous collection of data relating to the second service. The opaque identifier can be used in the collection of data relating to the second service in an anonymous manner. The opaque identifier can be transmitted to or shared with the second service.

In another aspect, methods can comprise receiving an opaque identifier associated with a user and a first service. A selection of a second service can also be received. The opaque identifier can be registered with the second service and data associated with the second service can be collected.

In yet another aspect, methods can comprise receiving an opaque identifier associated with a user and a first service. Authentication of the opaque identifier can be requested from a second service. Content can be processed using the second service and data relating to the processing or use of content can be collected. The opaque identifier can facilitate anonymous collection of data.

Additional advantages will be set forth in part in the description which follows or may be learned by practice. The advantages will be realized and attained by means of the disclosure, and elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
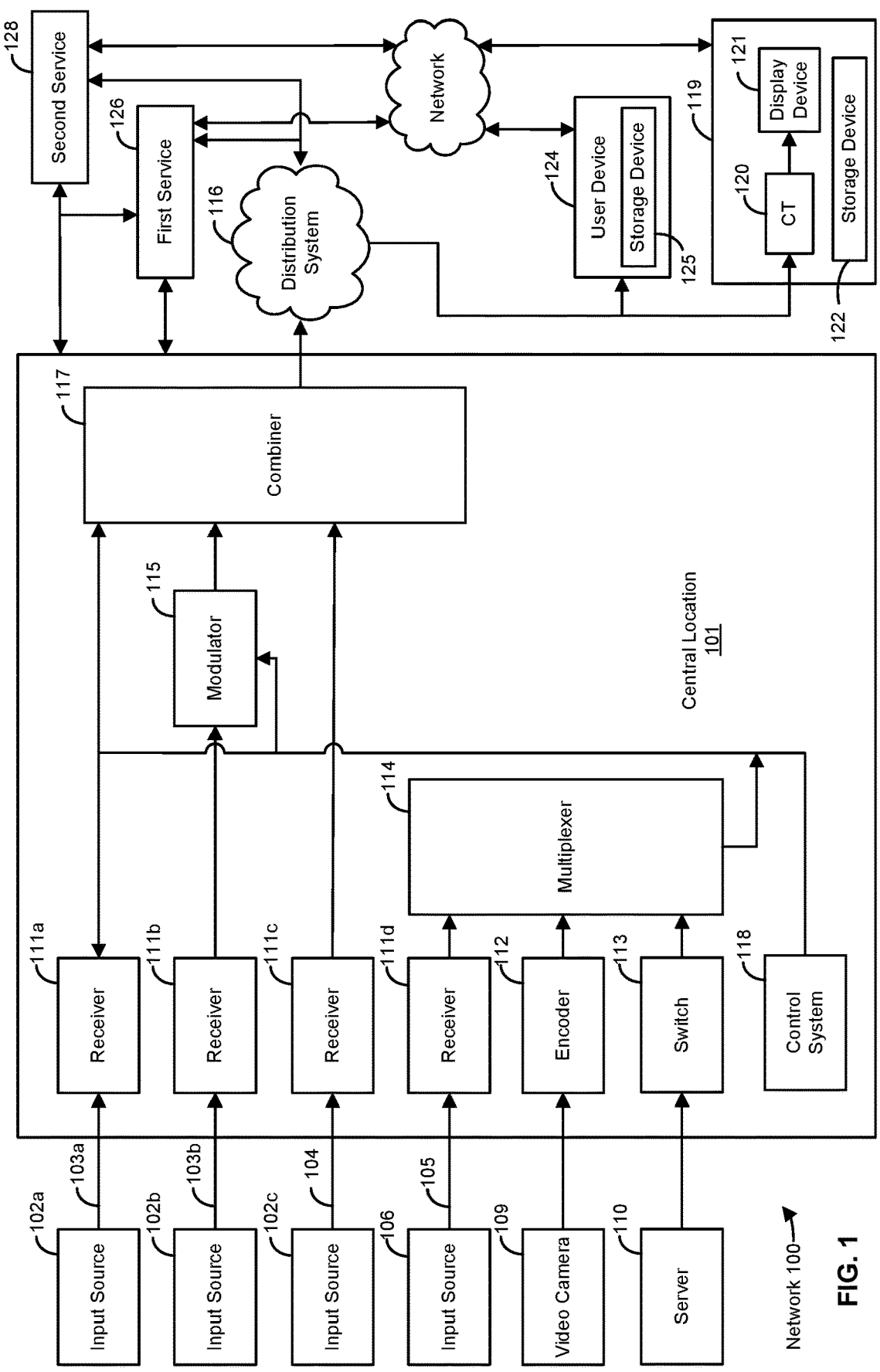
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary network in which the present methods and systems can operate. The present disclosure relates to systems and methods for providing services. In an aspect, services can be monitored. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.) which can receive content, data, input programming, and the like, from multiple sources. The central location 101 can combine the content from the various sources and can distribute the content to user locations, such as location 119, via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices, such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116. The networks may also be an end-to-end IP network utilizing appropriate components.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) that can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a fixed or mobile computing device, a TV, a monitor, or satellite receiver. In an exemplary aspect, the methods and systems disclosed can be located within, or performed on, one or more wireless device, CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as network storage.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. Other display devices and networks can be used. The user device 124 can be a widget or a virtual device for displaying content in a picture-in-picture environment such as on the display device 121, for example.

In an aspect, a storage device 125 can be in communication with one or more of the user device 124 and the central location 101 to send/receive data therebetween. As a further example, the storage device 125 can be located remotely from the user device 124, such as a network storage medium. In an aspect, the storage device 125 can store identifiers, keys, licenses, credentials, and authentication-related data. However, other information can be stored on the storage device 125.

In an aspect, a first service 126 can be in communication with one or more of the CT 120 and the user device 124 to monitor (e.g., detect, sense, track, log, sample, etc.) use of and/or interaction with one or more of the CT 120 and the user device 124. As an example, the first service 126 can be configured to monitor behavior of one or more users of one or more of the CT 120 and the user device 124. As another example, the first service 126 can be configured to monitor listening and/or viewing habits of one or more users. As a further example, the first service 126 can comprise an advertisement delivery service.

In an aspect, the first service 126 can be configured to collect data relating to the content being consumed via a particular device such as the CT 120 and the user device 124. As an example, the first service 126 can be configured to collect data, such as demographic data, preference data, habit data, and the like, relating to one or more users. As a further example, the first service 126 can be configured to process collected data for statistical analysis, ratings analysis, trend analysis, security analysis, integrity analysis, and the like. In an aspect, the first service 126 can be configured to collect data relating to a second service 128.

In an aspect, the second service 128 can be in communication with one or more first services 126, one or more of the CT 120 and the user device 124, and/or other devices. The second service 128 can be, for example, a content delivery service, an authentication service, data collection service, access control service, software as a service, a computing device functioning as a service, and/or a user management device. The second service 128 can be any service and/or system and can be associated with one or more service providers. In an aspect, the second service 128 can facilitate distribution and/or presentation of data, such as content, to one or more of the CT 120 and the user device 124 or other devices. As an example, the second service 128 can comprise one or more content players for converting an input into a rendered presentation such as an audio or video presentation. In an aspect, a user and/or device can have certain user rights associated with the content that the particular user and/or device can consume. As an example, a user may have the rights to store certain programming on a digital recorder, storage medium, buffer, or the like. As a further example, a user may have rights to consume a particular content or programming. In an aspect, one or more second services 128 can determine whether a particular user and/or device has appropriate rights to consume certain content. As an example, once a particular user and/or device is authenticated as having appropriate rights, content can be consumed via the particular device. As content is being consumed, the first service 126 can monitor the content and/or the user's interaction with the device.

Figure 2:
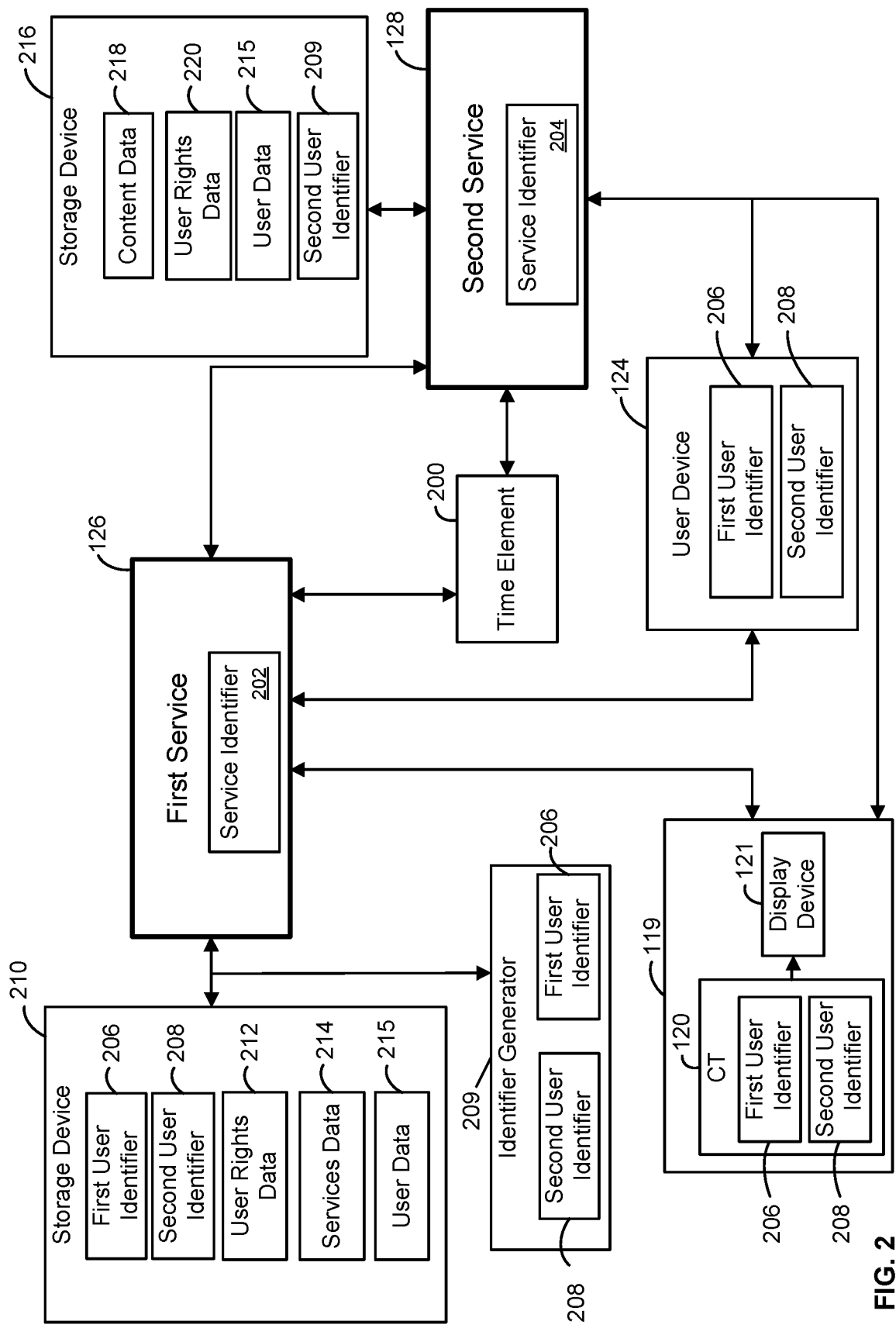
FIG. 2 is a block diagram of an exemplary system and network.

In an aspect, a system and network can be used to authenticate a particular user and/or device for the consumption of particular content. As an example, once the user and/or device are authenticated, consumption of the particular content can be monitored. In an aspect, FIG. 2 illustrates various aspects of an exemplary network in which the present methods and systems can operate. In an aspect, provided are systems and methods for providing services to a user device. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

In an aspect, FIG. 2 illustrates various aspects of an exemplary network and system in which one or more of the disclosed methods and systems can operate. In an aspect, one or more of the first service 126 and the second service 128 can be in communication with a user device, such as the CT 120, the user device 124, the Internet (or another local or public network), and/or a communication network to transmit and/or receive information relating to content being delivered to or consumed by a particular user or device. As an example, other communications devices or elements, such as software, virtual elements, computing devices, router devices, and the like, can serve as one or more of the first service 126 and/or the second service 128. In an aspect, one or more of the first service 126 and the second service 128 can be disposed remotely from the user location 119. However, one or more of the first service 126 and second service 128 can be disposed anywhere, including at the user location 119 and/or in one or more of the CT 120 and the user device 124, for example.

In an aspect, a time element 200 can be in communication with one or more of the first service 126 and the second service 128 to provide a timing reference thereto. As an example, the time element 200 can be a clock. As a further example, the time element 200 can transmit information to one or more of the first service 126 and the second service 128 for associating a time stamp with a particular event executed and/or received by one or more of the first service 126 and the second service 128. In an aspect, one or more of the first service 126 and the second service 128 can cooperate with the time element 200 to associate a time stamp with events having an effect on the content delivered to a user or an associated device, such as the CT 120 and/or the user device 124. For example, events can comprise license request, license grant, subscription life-cycle, license denial, a channel tune, a remote tune, remote control events, playpoint audits, playback events, program events including a program start time and/or end time and/or a commercial/intermission time, and/or playlist timing events, and the like.

In an aspect, a service identifier 202 can be associated with the first service 126. As an example, the service identifier 202 can be an addressable element such as a uniform resource identifier (URI), uniform resource locator (URL), file link, hyperlink, executable code, icon, shortcut, or the like. The service identifier 202 may contain information such as metadata or any other service related information. As a further example, the CT 120 and/or the user device 124 can initiate communications with the first service 126 using the service identifier 202. In an aspect, the service identifier 202 can distinguish the first service 126 from other services and/or resources.

In an aspect, another service identifier 204 can be associated with the second service 128. As an example, the service identifier 204 can be an addressable element such as a uniform resource identifier (URI), uniform resource locator (URL), file link, hyperlink, executable code, icon, shortcut, or the like. As a further example, the CT 120 and/or the user device 124 can initiate communications with the second service 128 using the service identifier 204. In an aspect, the service identifier 204 can distinguish the second service 128 from other services and/or resources.

In an aspect, a first user identifier 206 can be associated with a particular user and/or user device (e.g., CT 120 and/or the user device 124). As an example, the first user identifier 206 can be any identifier, such as a token, character, string, or the like, for differentiating one user or user device (e.g., user device 124) from another user or user device. As a further example, the first user identifier 206 can identify a user or user device as belonging to a particular class of users or user devices. In an aspect, the first user identifier 206 can comprise information relating to the user device such as a manufacturer, a model or type of device, a service provider associated with the user device 124, a state of the user device 124, a locator, and/or a label or classifier. Other information can be represented by the first user identifier 206. As an example, the first user identifier 206 can comprise user credentials for authenticating the user with a particular service. As a further example, the first user identifier 206 can comprise user credentials for authenticating the user with the first service 126. In an aspect, the first user identifier 206 can be generated by a user and/or assigned by a service, such as the first service 126, to distinguish a particular user and/or user device from other users and devices. As an example, the first user identifier 206 can comprise a user name and a passkey that can be processed by the first service 126 to authenticate the holder of the first user identifier 206. As a further example, the first user identifier 206 can be a transparent identifier relative to the first service 126. A transparent identifier can be associated with known user information stored and or accessed by the first service 126 to provide further details about the user and/or device associated with the transparent identifier. As an example, a user may have a user profile with associated personal information, demographic information, contact information, and the like. As a further example, the transparent identifier can facilitate the identification of a user's association with a user profile. In an aspect, a transparent identifier can comprise a user name and/or demographic information such as age, gender, address, and the like. As an example, when the service issuing the transparent identifier (e.g., first service 126) receives information tagged with the transparent identifier, the service can process the received information by matching the transparent identifier with a stored record.

In an aspect, a second user identifier 208 can be associated with a particular user and/or user device (e.g., CT 120 and/or the user device 124). As an example, the second user identifier 208 can be any identifier, token, character, string, or the like, for differentiating one user or user device (e.g., user device 124) from another user or user device. As a further example, the second user identifier 208 can identify a user or user device as belonging to a particular class of users or user devices. In an aspect, the second user identifier 208 can comprise information relating to the user device such as a manufacturer, a model or type of device, a service provider associated with the user device 124, a state of the user device 124, a locator, and/or a label or classifier. Other information can be represented by the second user identifier 208. As an example, the second user identifier 208 can comprise user credentials for authenticating the user with a particular service. As a further example, the second user identifier 208 can comprise user credentials for authenticating the user with the second service 128. In an aspect, the second user identifier 208 can be generated by a user and/or assigned by a service, such as the first service 126 or the second service 128, to distinguish a particular user and/or user device from other users and devices. As an example, the second user identifier 208 can comprise a user name and a passkey that can be processed by the second service 128 to authenticate the holder of the second user identifier 208. As a further example, the second user identifier 208 can be a transparent identifier relative to the first service 126. In an aspect, the second user identifier 208 can be an opaque identifier relative to the second service 128. As an example, the opaque identifier can facilitate the authentication of an anonymous user and/or device. The opaque identifier can comprise anonymous credentials to facilitate authentication. However, the authentication of the opaque identifier may not reveal any further information relating to the authenticated user and/or device. In an aspect, the opaque identifier allows a user to access a particular service without divulging personal, identifiable information. Instead, the accessed service can identify the user as an anonymous user with an anonymous identifier.

In an aspect, the opaque identifier can be readable by the service (e.g., first service 126) that issued the opaque identifier, but may not be completely readable or identifiable by a non-issuing service. As an example, the opaque identifier can comprise a hash (e.g., hash-based message authentication code secure hash algorithm (e.g., HMAC-SHA1)), message digest algorithm (MD5), and the like. As a further example, the opaque identifier can be encrypted, such as by using advanced encryption standard (AES), data encryption standard (DES), or other encryption systems. In an aspect, the opaque identifier can comprise one or more of a unique identifier, a username, and/or a complete set of user information, including, for example, demographic information. In an aspect, encryption as an opaque identifier does not require the issuing service or system to refer to a database of stored resources to retrieve user information linked to the identifier. As an example, a non-issuing service or system can use the opaque identifier to tag messages transmitted to the issuing service, so that the issuing service can apply a user context to the communication (e.g., message).

In an aspect, an identifier generator 209 can be configured to create one or more identifiers, such as the first user identifier 206 and/or second user identifier 208. As an example, the identifier generator 209 can be configured to associate one or more identifiers with a particular user and/or user device. In an aspect, the identifier generator 209 can be configured to generate the second user identifier 208 as an opaque identifier based upon the first user identifier 206. As an example, the first user identifier 206 can be used to authenticate a user at the first service 126 and the second user identifier 208 can be generated as an opaque identifier to facilitate anonymous authentication of the same user at the second service 128. As a further example, the opaque identifier may be anonymous to the second service 128, but transparent to the first service 126. Accordingly, any interactions of the authenticated anonymous user at the second service 128 can be monitored in a known, transparent manner by the first service 126.

In an aspect, a storage device 210 can be in communication with the first service 126 to allow the first service 126 to store and/or retrieve data to/from the storage device 210. As an example, the storage device 210 can store data relating to the first user identifier 206, the second user identifier 208, user rights data 212, service data 214, and/or user data 215.

In an aspect, the user rights data 212 can comprise information relating to the permissions and/or entitlements associated with a particular user and/or device. As an example, the user rights data 212 can comprise information, such as subscription information, identification information, location information, and/or timing information relating to a particular user or user device. In an aspect, the user rights data 212 can be associated with a source of the content or particular items of content. As an example, the user rights data 212 can be associated with authentication to access the first service 126. The storage device 212 can store information relating to users, user preferences, user interactions, user habits, and user devices and configurations, among other data.

In an aspect, the services data 214 can comprise information relating to one or more services such as the second service 128. As an example, the service data 214 can comprise one or more service identifiers 202, 204 to facilitate communication with one or more services. As another example, the service data 214 can comprise configuration information to facilitate the generation of a user identifier that can be used for authentication at a particular service. As a further example, the service data 214 can comprise information relating to communications with the one or more services, operational characteristics such as the number of users that can access the service concurrently, contact information for the entity operating the service, security certificates that protect the security/privacy of service interactions, and the like.

In an aspect, the user data 215 can comprise information relating to user experience settings, user viewing habits, and/or preferences for a particular user. As an example, user data 215 can comprise image, video, and audio content preferences that can be provided directly by a user or can be collected based upon user behavior or interactions. As a further example, user data 215 can comprise content settings (e.g., genre, ratings, parental blocks, subtitles, version of content such as director's cut, extended cut or alternate endings, time schedule, permission, and the like), environmental settings (e.g., temperature, lighting, tactile feedback, and the like), and presentation settings (e.g., volume, picture settings such as brightness and color, playback language, closed captioning, playback speed, picture-in-picture, split display, and the like), which can be provided by a user or learned from user habits and/or behavior. Other settings, preferences, and/or permissions can be stored and/or processed as the user data 215 such as viewing patterns & habits, duration of service use, and/or time-of-day of service use.

In an aspect, a storage device 216 can be in communication with the second service 128 to allow the second service 128 to store and/or retrieve data to/from the storage device 216. As an example, the storage device 216 can store data relating to content data 218, user rights data 220, user data 215, and/or data relating to the second user identifier 209. In an aspect, the storage device 216 can store data relating to content transmitted or scheduled to be transmitted to the CT 120 and/or the user device 124.

In an aspect, the content data 218 can comprise information relating to the permissions and/or entitlements associated with a particular content and/or device. As an example, the content data 218 can comprise information, such as subscription information, identification information, location information, and/or timing information relating to a particular content, media, and/or programming. In an aspect, the content data 218 can be associated with a source of the content. As a further example, the content data 218 can have time stamps or markers associated therewith. In an aspect, the content data 218 can be used to determine whether a request for a license to particular content should be granted or denied. For example, a particular content offering can have associated therewith content data 218 comprising requirements that must be met in order to grant a license to the content offering. The storage device 216 can store information relating to content, entitlement, users, devices and configurations relating to the same.

In an aspect, the user rights data 220 can comprise descriptive information, and information relating to the permissions and/or entitlements associated with a particular user and/or device. As an example, the user rights data 220 can comprise information, such as subscription information, identification information, location information, and/or timing information relating to a particular user or user device. In an aspect, the user rights data 220 can be associated with a source of the content. As an example, the user rights data 220 can comprise user credentials, comparators, and the like for authentication to allow user access to the second service 128. The storage device 220 can store information relating to users, user interactions, user habits, user preferences, and user devices and configurations.

Figure 3:
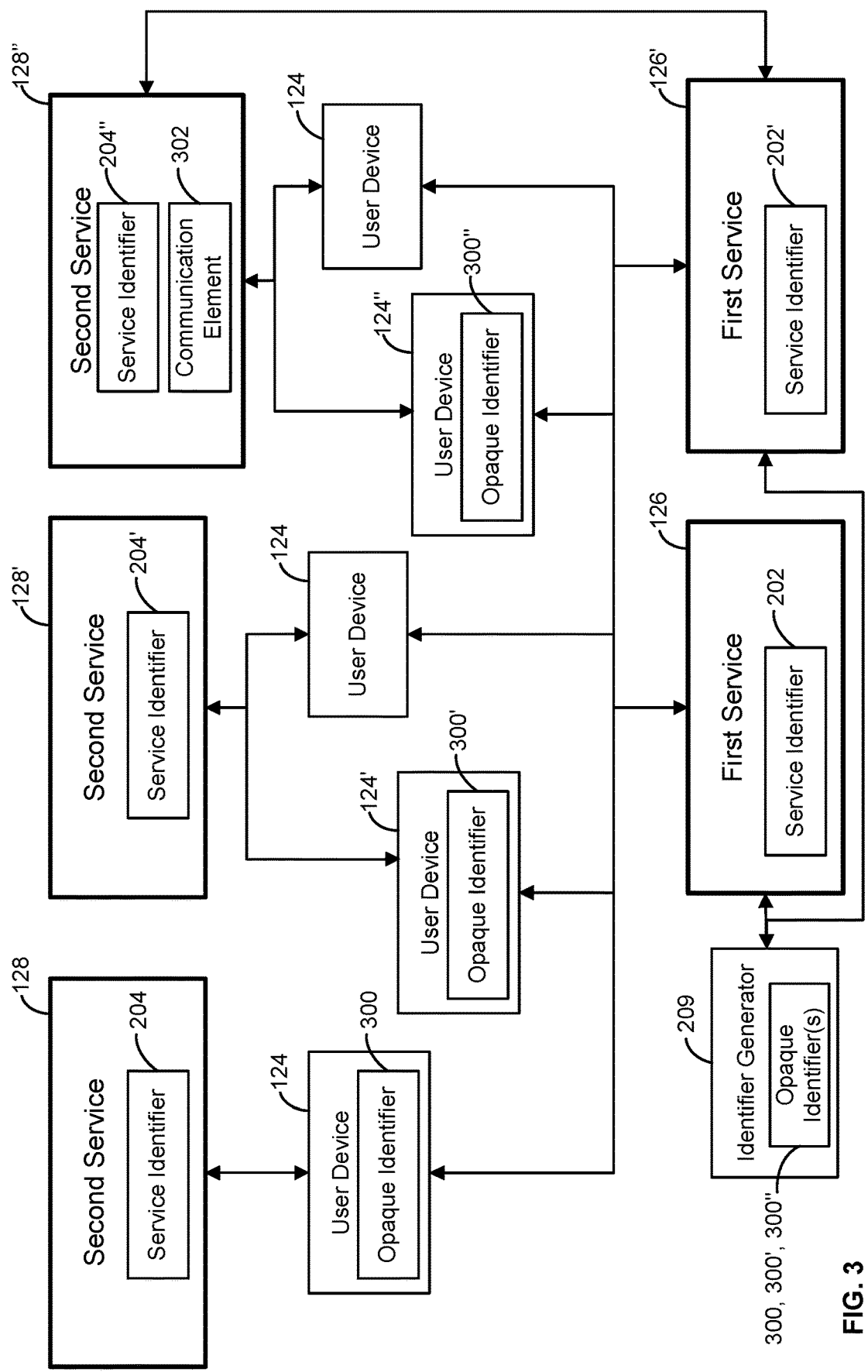
FIG. 3 is a block diagram of an exemplary system and network.

FIG. 3 illustrates various aspects of another exemplary system and network in which the present methods can operate. In an aspect, one or more of the first services 126, 126' and/or the one or more second services 128, 128', 128" can be in communication with one or more of a plurality of user devices 124, 124', 124". The services and user devices may also be in communication with local or wide area network, such as the Internet. One such network may be a communication network configured to receive or deliver (or otherwise access) information relating to content being delivered to or consumed by a particular user. As an example, other elements, such as software, virtual elements, computing devices, router devices, and the like, can comprise or serve as one or more of the first services 126, 126' and the second services 128, 128', 128". As a further example, one or more of the first services 126, 126' and the second services 128, 128', 128" can process user rights associated with content and/or programming to determine the permissions of a particular user or device.

In an aspect, a service identifier 202, 202' can be associated with a particular one of the first services 126, 126'. As an example, a first service identifier 202 can be associated with a first one of the first services 126. As another example, a second service identifier 202' can be associated with a second one of the first services 126'. In this way, each of the first services 126, 126' can be associated with a discrete service identifier 202, 202'. As an example, one or more of the service identifiers 202, 202' can comprise an addressable element such as a URL. As a further example, one or more of the user devices 124, 124', 124" can communicate with one or more of the first services 126, 126' using the service identifiers 202, 202'.

In an aspect, a service identifier 204, 204', 204" can be associated with one or more of the second services 128, 128', 128". As an example, the service identifiers 204, 204', 204" can each comprise an addressable element such as a URL. As a further example, one or more of the user devices 124, 124', 124" and/or one or more of the first services 126, 126' can communicate with one or more of the second services 128, 128', 128" using the service identifiers 204, 204', 204". In an aspect, one or more of the second services 128, 128', 128" can communicate with one or more of the first services 126, 126' the service identifiers 202, 202'.

In an aspect, the identifier generator 209 can be configured to create one or more identifiers, such as opaque identifiers 300, 300', 300". The identifier generator 209 can be disposed in any location or network. The identifier generator 209 can be a stand-alone element or distributed among devices and software. As an example, a user or device can communicate with one more of the first services 126, 126' to generate or receive one or more of the opaque identifiers 300, 300', 300". As a further example, one or more of the opaque identifiers 300, 300', 300" can be associated with and/or transmitted to the user to facilitate anonymous authentication of the same user at one or more of the second services 128, 128', 128". In an aspect, the received one or more of the opaque identifiers 300, 300', 300" can be stored locally in the device. As a further example, the opaque identifier may be anonymous to the one or more of the second services 128, 128', 128", but transparent to the one or more of the first services 126, 126'. Accordingly, in one aspect, any interactions of the authenticated anonymous user (or device) at the one or more of the second services 128, 128', 128" can be monitored in a known, transparent manner by the one or more of the first services 126, 126'.

In an aspect, one or more of the second services 128, 128', 128" can comprise a communication element 302 for communicating data between the one or more of the second services 128, 128', 128" and one or more of the first services 126, 126' or other services or systems. As an example, the communication element 302 can be configured to encrypt and/or decrypt data. As a further example, data (e.g., user data 215) can be collected at the one or more of the second services 128, 128', 128" and transmitted to one or more of the first services 126, 126' in an encrypted form. In an aspect, one or more of the opaque identifiers 300, 300', 300" can be used to encrypt data relating to or intended to be associated with the opaque identifiers 300, 300', 300". As an example, when a user is anonymously authenticated using one of the opaque identifiers 300, 300', 300", the one of the opaque identifiers 300, 300', 300" used for authentication can also be used as part of the encryption process, such as a key, hash, or the like. In an aspect, data collected can be transmitted asynchronously to one or more of the first services 126, 126'. As an example, data can be transmitted using various protocols, such as the POST/PUT command of the hypertext transfer protocol. However, other protocols can be used.

Figure 4:
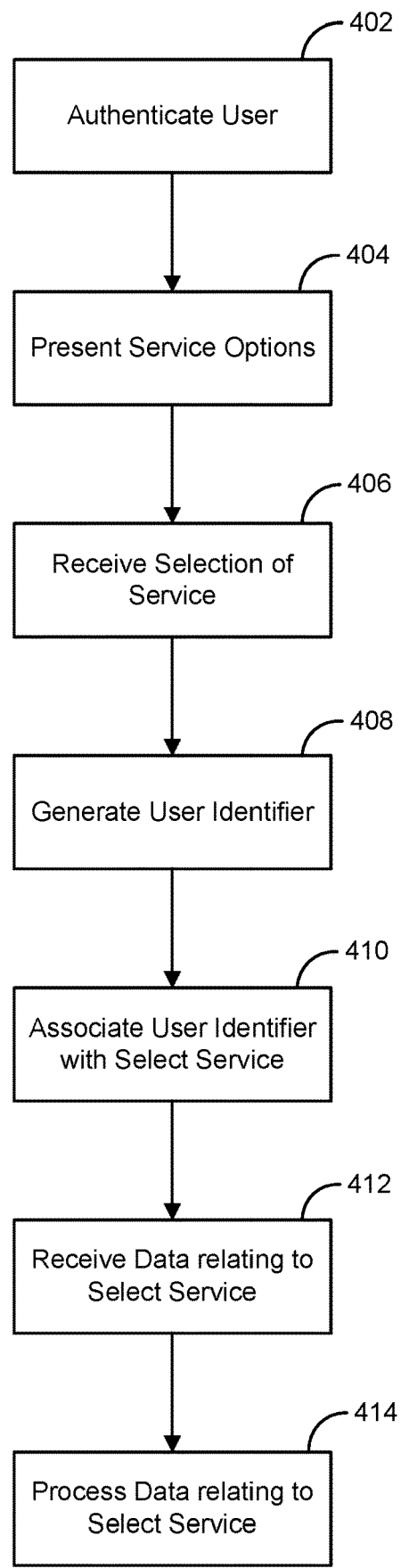
FIG. 4 is a flow chart of an exemplary method.

FIG. 4 illustrates an exemplary method. The method illustrated in FIG. 4 will be discussed, for an example illustration, in reference to FIGS. 1-3. In step 402, a user and/or user device can be authenticated. In an aspect, the user and/or user device can be associated with the first service 126. As an example, the user and/or user device can be authenticated by the first service 126. As a further example, authenticating the user can comprise authenticating user credentials associated with the user and the first service 126.

In step 404, one or more service options can be presented to the user. In an aspect, presenting the one or more service options can comprise presenting one or more service identifiers 202, 204 presented to the user. As an example, a user can selectively opt-in/opt-out the one or more service options to be presented from a group of available services. As a further example, one or more of the service options can relate to a service provider or a parameter relating to the service provided by the service provider.

In step 406, a selection of a service can be received. In an aspect, the user can provide an input representing a selection of one or more services. As an example, receiving a selection of a service can comprise receiving a user-provided input relating to one or more of the service options presented in step 404. As a further example, a user authenticated with the first service 126 can select one or more second services 128. However, such a selection can be received at any time. In an aspect, the user can be prompted to identify one or more services with which the user has or desires access. As an example, one or more services can be automatically detected and/or selected.

In step 408, a user identifier can be generated (e.g., created, retrieved, populated, associated, instantiated, and the like). In an aspect, the user identifier can be associated with the user and the first service 126. As an example, the user identifier can facilitate the collection of data relating to one or more services (e.g., consumption of such services). In an aspect, the user identifier can be an opaque identifier. As an example, the opaque identifier can be transparent to the first service 126. As a further example, the opaque identifier can be anonymous to the second service 128. In an aspect, the opaque identifier can facilitate the anonymous collection of data relating to one or more services. As an example, the user identifier can be user-specific and/or device-specific to distinguish between users and/or devices.

In step 410, the user identifier can be associated with the select service from step 406. As an example, the select service can be one or more second services 128. In an aspect, associating the user identifier with the select service can comprise transmitting the user identifier to a user device in communication with the select service. As an example, transmitting the user identifier with the select service can comprise authenticating the user identifier with the select service. As a further example, transmitting the user identifier to the selected service can comprise anonymously authenticating an opaque user identifier with the select service.

In step 412, data relating to the select service can be received (e.g., collected, stored, routed, etc.). In an aspect, data collected from the select service can relate to an interaction of the user with the select service. As an example, data collected from the select service can relate to content processed by the select service. As another example, data collected from the select service can relate to consumption of the second service by a user and/or device. As a further example, data collected from the select service can be associated with the user identifier. In an aspect, the data transmitted from the select service to a first service is an opaque data token that identifies a time-offset within a piece of audio/video media. As an example, the content of the opaque token can be unknown to the select service. As a further example, the first service can associate the opaque data token with an opaque user identifier and can send the opaque user identifier to the select service for anonymous data collection. Accordingly, in one aspect, during the collection of data, there is no indication to the user that the monitoring is occurring. As a further example, the user can be informed during the use of the select service that such use can enable monitoring of the user's activity.

In step 414, the data collected can be processed and in some aspects, the data collected can be encrypted. As an example, the data collected can be encrypted using the user identifier generated in step 408. As a further example, the data collected can be transmitted to the service that generated the user identifier in step 408. As an example, data can be transmitted using various protocols such as the POST/PUT command of the hypertext transfer protocol. However, other protocols can be used. In an aspect, processing the collected data can comprise statistical analysis, ratings analysis, demographic analysis, security analysis, and the like.

Figure 5:
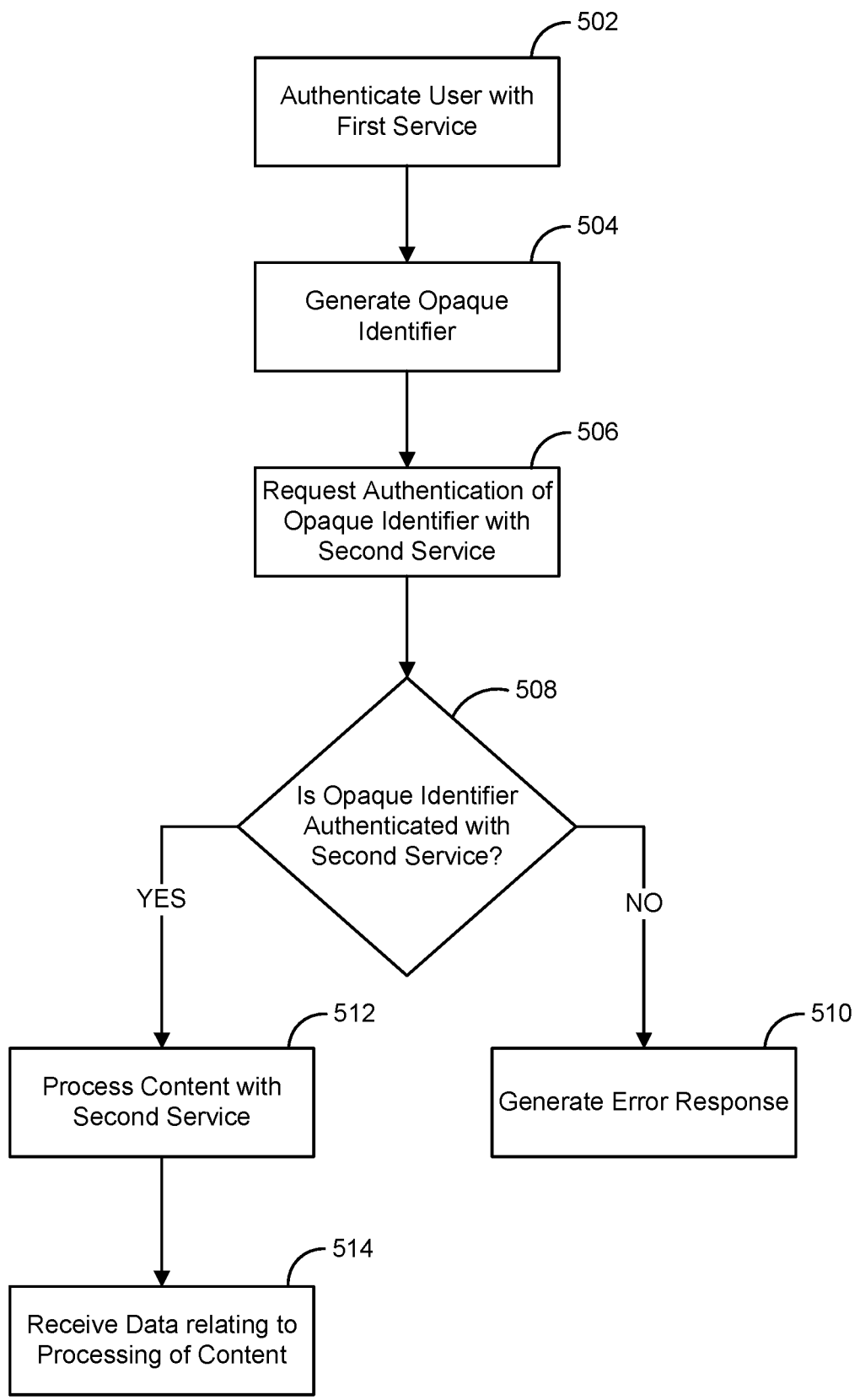
FIG. 5 is a flow chart of an exemplary method.

FIG. 5 illustrates an exemplary method for providing services. The method of FIG. 5 will be discussed, for an example illustration, in reference to FIGS. 1-3. In step 502, a user and/or user device can be authenticated with the first service 126. In an aspect, the user and/or user device can be associated with the first service 126 by the first user identifier 206. As an example, the first user identifier 206 can be authenticated by the first service 126. As a further example, authenticating the user can comprise authenticating user credentials associated with the user and the first service 126.

In step 504, an opaque identifier 300 can be generated (e.g., created, retrieved, populated, associated, registered and the like). In an aspect, the opaque identifier 300 can be associated with the user and the first service 126. As an example, the opaque identifier 300 can facilitate the collection of data relating to one or more services. In an aspect, the opaque identifier 300 can be transparent to the first service 126. As a further example, the opaque identifier 300 can be anonymous to another service, such as the second service 128. In an aspect, the opaque identifier 300 can facilitate the anonymous collection of data relating to one or more services. In an aspect, the opaque identifier 300 can be generated specifically for the second service 128. As an example, the opaque identifier 300 can be associated with the second service 128 via a registration/setup process. In an aspect, the registration/setup process comprises a user providing authentication credentials and demographic information to the first service 126. The first service 126 can use the user information to generate a data token such as the opaque identifier 300 that is presented via an application deep link, to the user device. The deep link can enable the user device to store the opaque identifier 300 and to activate a monitoring feature to monitor the second service 128.

In step 506, authentication of the opaque identifier 300 can be requested from the second service 128. In an aspect, the opaque identifier 300 can be processed by the second service 128 to determine whether the opaque identifier 300 is valid and/or authenticated. As an example, the opaque identifier 300 can be specifically generated for the second service 128, such that the second service 128 can anonymously authenticate the opaque identifier 300 without having to know personal information relating to the user (or device) of the opaque identifier 300. In an aspect, the second service 128 is not required to authenticate the opaque identifier 300. As an example, the second service 128 can act as a conduit for the opaque identifier 300. As a further example, a mechanism can be included at the second service 128 to authenticate the opaque identifier 300. In an aspect, the authenticity of a given opaque identifier can be confirmed, for example, through the use of digital signature techniques that involve the use of shared secrets and cryptographic hashes (e.g. HMAC-SHA1). In an aspect, the first service 126 can verify opaque identifiers that have been issued by the first service 126. However, limiting the use of opaque identifiers to only those identifiers that have been authenticated by the second service can be implemented for performance optimization.

In step 508, if the authentication of the opaque identifier 300 is granted (e.g., at the first service 126 and/or second service 128), the process can continue to step 512. If authentication of the opaque identifier 300 is denied (e.g., at the first service 126 and/or second service 128), an error response can be generated at step 510.

In step 512, content can be processed (e.g., converted, rendered, presented, displayed, consumed, etc.) using the second service 128. In an aspect, the second service 128 can comprise one or more content players for converting an input into a rendered presentation such as audio or video presentation capable of being consumed by a user. As an example, the second service 128 can comprise a streaming content source such as a converter, a digital recorder, a network storage device, a gaming system, and/or media systems.

In step 514, data relating to the processing of content can be collected. For example, collection can comprise receiving data via automated push or pull data gathering operations. In an aspect, user data, such as user data 215, can be collected based upon the content processed in step 512. As an example, the data can be collected anonymously. As a further example, the opaque identifier 300 can facilitate the anonymous collection of data. In an aspect, data collection can be anonymous with respect to the second service 128, because the second service 128 does not understand the identity comprised by the opaque identifier 300. As an example, the data collection may not be anonymous with respect to the first service 126, because the first service 126 created the opaque identifier 300 and understands content and associations represented by the opaque identifier 300.

In an exemplary aspect, a user can log into a first service 126 such as a service for ratings panelists, secret shoppers, reviewers, or data collectors, for example. As an example, the user can be prompted to select a second service for conducting anonymous collection of data. As a further example, the first service 126 can automatically provide user access to the second service 128 using an anonymous identifier or opaque identifier 300. In an aspect, the second service 128 can be a content providing service, whereby the user can consume content. As an example, the second service 128 can provide content programming and the first service 126 can comprise a ratings service for determining ratings, audience metrics such as size or composition, regional or market statistics, and/or viewership of a particular content or programming provided via the second service 128. In an aspect, the second service 128 can process the opaque identifier 300 to allow access to the content provided by the second service 128. Since the opaque identifier 300 is anonymous to the second service 128, the second service 128 can allow the user, device, and/or the first service 126 to track the content and/or information relating to the content without divulging the actual identity of the user and or device. In an aspect, the first service 126 can receive data from the second service 128 that is associated with the opaque identifier 300. In this way, the first service 126 can process the data knowing the identity of the user. As an example, audience panelists can use the first service 126 and the opaque identifier 300 to anonymously collect data relating to the second service 128, while allowing the first service 126 to access identifiable information about the audience panelists. In an aspect, the first service 126 and the second service 128 can be executed by a single device. For example, the first service 126 and the second service 128 can be software stored and executed on a user device. As another example, the first service 126 can be a portal accessible via a network communication channel and the second service 128 can be software stored on a user device. In an aspect, the first service 126 and the second service 128 can be stored, accessed, and/or executed via separate devices. As an example, a first device can be used to register with the first service 126 and receive the opaque identifier 300. As a further example, a second separate device can be used to access the second service 128 using the opaque identifier 300. The first service 126 and/or the second service 128 can be or comprise software, applications, devices, and the like.

Figure 6:
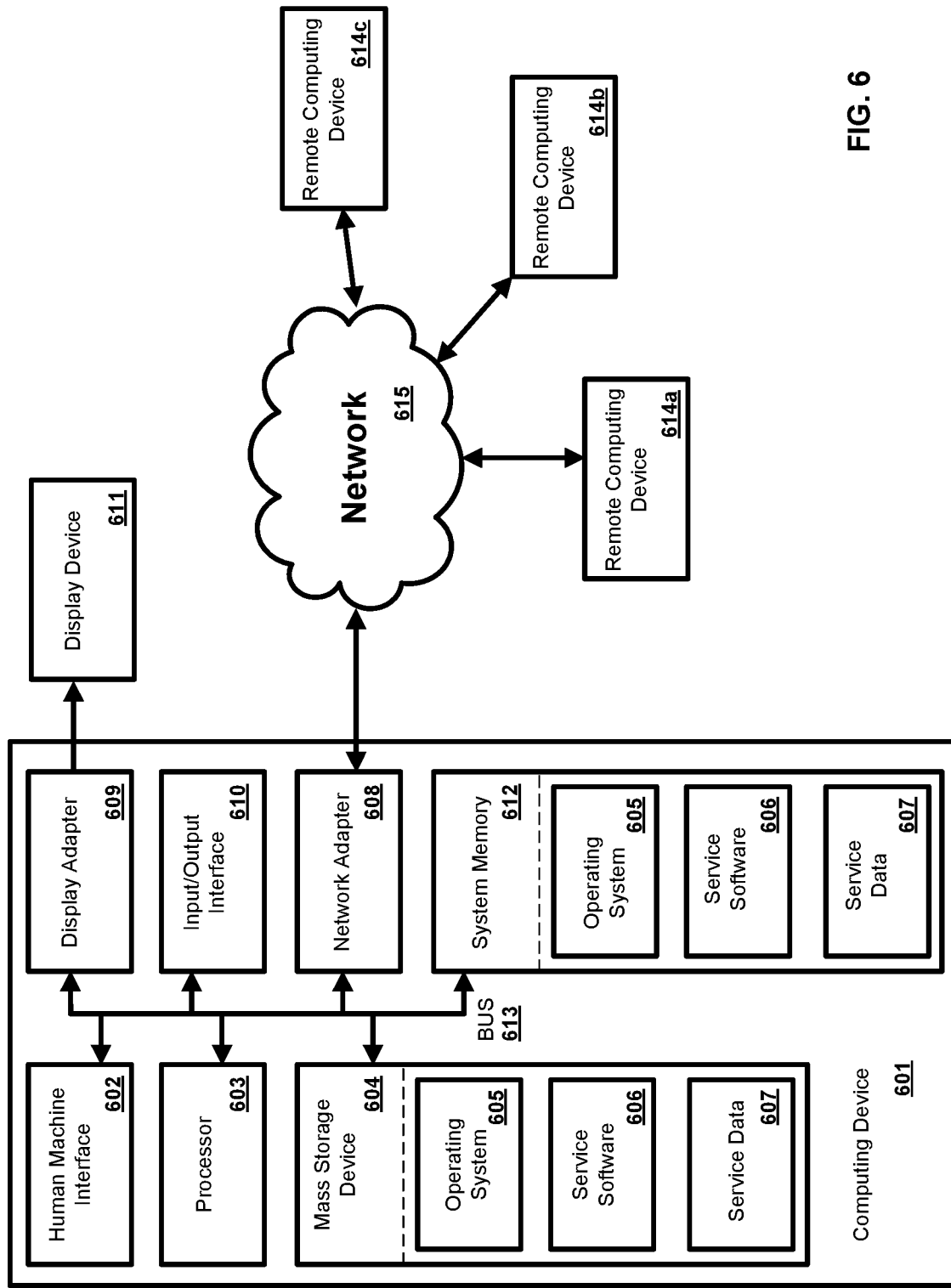
FIG. 6 is a block diagram of an exemplary computing system.

In an exemplary aspect, the methods and systems can be implemented on a computing system such as computing device 601 as illustrated in FIG. 6 and described below. By way of example, one or more of the first service 126 and the second service 128 of FIGS. 1-2 can be an application, a subscription service, a ratings service, a data collection service, a service provider function, and/or a service computing device. As a further example, one or more of the first service 126 and the second service 128 can be a computing device such as illustrated in FIG. 6. Similarly, the methods and systems disclosed can utilize one or more computers to perform one or more functions in one or more locations. FIG. 6 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, service software 606, service data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as service data 607, and/or program modules, such as operating system 605 and service software 606 that are immediately accessible to and/or are presently operated on by the processing unit 603.

In another aspect, the computing 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and service software 606. Each of the operating system 605 and service software 606 (or some combination thereof) can comprise elements of the programming and the service software 606. Service data 607 can also be stored on the mass storage device 604. Service data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, visual systems, such as Microsoft's Kinect, audio systems that process sound such as music or speech, a traditional silver remote control, tactile input devices such as gloves, a touch-responsive screen, body coverings, and the like. These and other input devices can be connected to the processing unit 603 via a human machine interface 602 that is coupled to the system bus 613, but can be connected by other interface and bus structures, such as a parallel port, a game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614*a,b,c*. By way of example, a remote computing device can be a personal computer, a portable computer, a smartphone, a server, a router, a network computer, a peer device or other common network node, and so on. Logical connections between the computing device 601 and a remote computing device 614*a,b,c* can be made via a network 615, such as a local area network (LAN) and a general wide area network (WAN). Such network connections can be through a network adapter 608.

A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of service software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and/or the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
generating, by a demographic data collection service,
a plurality of identifiers,
wherein each identifier of the plurality of identifiers represents a unique consumer of content, and
wherein each identifier of the plurality of identifiers is anonymous to a content consumption data collection service and transparent to the demographic data collection service;
transmitting, by the demographic data collection service to the content consumption data collection service, the plurality of identifiers;
receiving, by the demographic data collection service,
content delivery data indicative of one or more events associated with content delivered to one or more of a plurality of mobile devices, wherein each of the plurality of mobile devices is associated with one of the unique consumers of content, and
one or more corresponding identifiers of the plurality of identifiers associated with the content delivery data;
associating demographic data with each identifier of the one or more corresponding identifiers of the plurality of identifiers; and
transmitting, by the demographic data collection service to the content consumption data collection service, the demographic data associated with each of the one or more corresponding identifiers of the plurality of identifiers.

2. The method of claim 1, wherein the content consumption data collection service comprises a data service that collects content delivery data, and wherein the demographic data collection service comprises a data provider service that collects demographic data.

3. The method of claim 1, wherein associating the demographic data with each identifier of the one or more of the plurality of identifiers comprises:
determining an identity of each unique consumer of content represented by the one or more of the plurality of identifiers; and
accessing demographic data based on the determined identities, wherein the demographic data is associated with each unique consumer of content represented by each identifier of the one or more of the plurality of identifiers.

4. The method of claim 1, wherein the content delivery data is received according to a hypertext transfer protocol operation.

5. The method of claim 1, wherein the one or more events associated with content delivered to the one or more of the plurality of mobile devices have an effect on content delivery.

6. The method of claim 1, wherein the one or more events associated with content delivered to the one or more of the plurality of mobile devices comprise one or more of a license request, a license grant, or a license denial.

7. The method of claim 1, wherein the one or more events associated with content delivered to the one or more of the plurality of mobile devices comprise one or more of a channel tune event, a remote tune event, or a remote control event.

8. The method of claim 1, wherein the one or more events associated with content delivered to the one or more of the plurality of mobile devices comprise one or more of a playpoint audit or a playback event.

9. The method of claim 1, wherein the one or more events associated with content delivered to the one or more of the plurality of mobile devices comprise a program event.

10. The method of claim 9, wherein the program event comprises one or more of a program start time, a program end time, a commercial time, or a playlist timing event.

11. The method of claim 1, wherein the demographic data collection service provides content programming to the one or more of the plurality of mobile devices.

12. A method comprising:
receiving, by a content consumption data collection service from a mobile device,
an identifier associated with the mobile device and with a unique consumer of content, and
content delivery data indicative of one or more events associated with content delivered to the mobile device,
wherein the identifier is anonymous to the content consumption data collection service and transparent to a demographic data collection service;
determining, by the content consumption data collection service, a timestamp associated with the one or more events, wherein the timestamp represents a time that the one or more events occurred;
providing, by the content consumption data collection service to the demographic data collection service, the identifier associated with the unique consumer of content;
receiving, by the content consumption data collection service from the demographic data collection service, demographic data for the unique consumer of content represented by the identifier; and
generating, based on the one or more events, the timestamp, or the demographic data, network performance data.

13. The method of claim 12, wherein the one or more events associated with content delivered to the one or more mobile device of the plurality of mobile devices have an effect on content delivery.

14. The method of claim 12, wherein the one or more events associated with content delivered to the mobile device comprise one or more of a license request, a license grant, or a license denial.

15. The method of claim 12, wherein the one or more events associated with content delivered to the mobile device comprise one or more of a channel tune event, a remote tune event, or a remote control event.

16. The method of claim 12, wherein the one or more events associated with content delivered to the mobile device comprise one or more of a playpoint audit or a playback event.

17. The method of claim 12, wherein the one or more events associated with content delivered to the mobile device comprise a program event.

18. The method of claim 17, wherein the program event comprises one or more of a program start time, a program end time, a commercial time, or a playlist timing event.

19. The method of claim 12, wherein the demographic data collection service provides content programming to the mobile device.

20. The method of claim 12, wherein generating, based on the one or more events, the timestamp, or the demographic data, the network performance data further comprises determining a source of the content delivered to the mobile device.

21. The method of claim 12, wherein generating, based on the one or more events, the timestamp, or the demographic data, the network performance data further comprises determining a content provider of the content delivered to the mobile device.

22. The method of claim 12, wherein generating, based on the one or more events, the timestamp, or the demographic data, the network performance data further comprises determining a user experience setting, a user viewing habit, or a preference for the unique consumer of content.

23. A method comprising:
receiving, by a content consumption data collection service from a mobile device,
content delivery data indicative of one or more events associated with content delivered to the mobile device and
an identifier associated with the content delivery data and a unique consumer of content,
wherein the identifier is anonymous to the content consumption data collection service and transparent to a demographic data collection service;
providing, by the content consumption data collection service, the identifier to the demographic data collection service;
receiving, by the content consumption data collection service from the demographic data collection service, processed data, wherein the processed data comprises demographic data based on the identifier, and wherein the demographic data is related to an identity of the unique consumer of content associated with the identifier;
analyzing, by the content consumption data collection service, the received processed data and the content delivery data; and
outputting, by the content consumption data collection service, a result of the analyzing.

24. The method of claim 23, wherein the identifier is generated by the demographic data collection service or by a content provider.

25. The method of claim 23, wherein the identifier is used by the demographic data collection service to determine demographic data of a consumer of the content.

26. The method of claim 23, wherein the one or more events associated with content delivered to the one or more mobile device of the plurality of mobile devices have an effect on content delivery.

27. The method of claim 23, wherein the one or more events associated with content delivered to the mobile device comprise one or more of a license request, a license grant, or a license denial.

28. The method of claim 23, wherein the one or more events associated with content delivered to the mobile device comprise one or more of a channel tune event, a remote tune event, or a remote control event.

29. The method of claim 23, wherein the one or more events associated with content delivered to the mobile device comprise one or more of a playpoint audit or a playback event.

30. The method of claim 23, wherein the one or more events associated with content delivered to the mobile device comprise a program event.

31. The method of claim 30, wherein the program event comprises one or more of a program start time, a program end time, a commercial time, or a playlist timing event.

32. The method of claim 23, wherein the demographic data collection service provides content programming to the mobile device.

33. The method of claim 23, wherein analyzing the received processed data and the content delivery data comprises generating network performance data.

34. The method of claim 23, wherein analyzing the received processed data and the content delivery data comprises mapping the identifier to a user profile containing the demographic data.

35. The method of claim 23, wherein analyzing the received processed data and the content delivery data comprises determining a source of the content delivered to the mobile device.

36. The method of claim 23, wherein analyzing the received processed data and the content delivery data comprises determining a content provider of the content delivered to the mobile device.

37. The method of claim 23, wherein analyzing the received processed data and the content delivery data comprises determining a user experience setting, a user viewing habit, or a preference for the unique consumer of content.

38. A method comprising:
receiving, by a content consumption data collection service from a demographic data collection service,
a plurality of identifiers,
wherein each of the plurality of identifiers corresponds to one of each of a plurality of unique consumers of content, and
wherein each of the plurality of identifiers is anonymous to the content consumption data collection service and transparent to the demographic data collection service;
assigning, by the content consumption data collection service, one of each of the plurality of identifiers to one of each of a plurality of mobile devices;
receiving, by the content consumption data collection service,
content delivery data indicative of one or more events associated with content delivered to each of the plurality of mobile devices and
a corresponding one of the plurality of identifiers representing one or more of the plurality of mobile devices;
providing, by the content consumption data collection service, the plurality of identifiers to the demographic data collection service;
receiving, by the content consumption data collection service from the demographic data collection service, processed data, wherein the processed data comprises demographic data for each of the plurality of unique consumers of content represented by each of the plurality of identifiers;
analyzing, by the content consumption data collection service, the received processed data and the content delivery data; and
outputting, by the content consumption data collection service, a result of the analyzing.

39. The method of claim 38, wherein providing, by the content consumption data collection service, the plurality of identifiers to the demographic data collection service comprises performing a hypertext transfer protocol operation.

40. The method of claim 38, wherein the one or more events associated with content delivered to the one or more of the plurality of mobile devices have an effect on content delivery.

41. The method of claim 38, wherein the one or more events associated with content delivered to each of the plurality of mobile devices comprise one or more of a license request, a license grant, or a license denial.

42. The method of claim 38, wherein the one or more events associated with content delivered to each of the plurality of mobile devices comprise one or more of a channel tune event, a remote tune event, or a remote control event.

43. The method of claim 38, wherein the one or more events associated with content delivered to each of the plurality of mobile devices comprise one or more of a playpoint audit or a playback event.

44. The method of claim 38, wherein the one or more events associated with content delivered to each of the plurality of mobile devices comprise a program event.

45. The method of claim 44, wherein the program event comprises one or more of a program start time, a program end time, a commercial time, or a playlist timing event.

46. The method of claim 38, wherein the demographic data collection service provides content programming to the plurality of mobile devices.

47. The method of claim 38, wherein analyzing the received processed data and the content delivery data comprises generating network performance data.

48. The method of claim 38, wherein analyzing the received processed data and the content delivery data comprises determining a source of the content delivered to the plurality of mobile devices.

49. The method of claim 38, wherein analyzing the received processed data and the content delivery data comprises determining a content provider of the content delivered to the plurality of mobile devices.

50. The method of claim 38, wherein analyzing the received processed data and the content delivery data comprises determining a user experience setting, a user viewing habit, or a preference for the unique consumer of content.

51. The method of claim 38, wherein analyzing the received processed data and the content delivery data comprises:
   determining the demographic data of each of the plurality of unique consumers of content represented by each of the plurality of identifiers contained in the content delivery data; and
   associating the demographic data with each of the plurality of identifiers contained in the received processed data.

52. The method of claim 38, the result of the analyzing comprises network performance data.

* * * * *

UNITED STATES PATENT AND TRADEMARK OFFICE
CERTIFICATE OF CORRECTION

PATENT NO. : 10,798,070 B2
APPLICATION NO. : 16/438113
DATED : October 6, 2020
INVENTOR(S) : David Mays and Jason Press Page 1 of 1

It is certified that error appears in the above-identified patent and that said Letters Patent is hereby corrected as shown below:

In the Specification

In Column 9, Line 44, replace "storage device 212" with --storage device 210--

In Column 10, Line 54, replace "storage device 220" with --storage device 216--

In Column 11, Line 29, replace "126′ the" with --126′ using the--

In Column 15, Lines 10-11, replace "user and or device" with --user and/or device--

Signed and Sealed this
Fourteenth Day of January, 2025

Derrick Brent
*Acting Director of the United States Patent and Trademark Office*